(12) United States Patent
Tsurumi

(10) Patent No.: US 8,033,575 B2
(45) Date of Patent: Oct. 11, 2011

(54) QUICK CONNECTOR

(75) Inventor: Kazuyuki Tsurumi, Bando (JP)

(73) Assignee: Sanoh Kogyo Kabushiki Kaisha, Tokyo (JP)

( * ) Notice: Subject to any disclaimer, the term of this patent is extended or adjusted under 35 U.S.C. 154(b) by 1051 days.

(21) Appl. No.: 11/665,322

(22) PCT Filed: Oct. 5, 2005

(86) PCT No.: PCT/JP2005/018459
§ 371 (c)(1),
(2), (4) Date: Sep. 24, 2007

(87) PCT Pub. No.: WO2006/040983
PCT Pub. Date: Apr. 20, 2006

(65) Prior Publication Data
US 2011/0127766 A1    Jun. 2, 2011

(30) Foreign Application Priority Data
Oct. 15, 2004    (JP) ................. 2004-301829

(51) Int. Cl.
*F16L 37/00* (2006.01)
(52) U.S. Cl. .......................................... 285/93; 285/305
(58) Field of Classification Search .............. 285/93, 285/305
See application file for complete search history.

(56) References Cited

U.S. PATENT DOCUMENTS

| | | | |
|---|---|---|---|
| 6,702,335 B2 * | 3/2004 | Bahner et al. .............. | 285/305 |
| 7,128,347 B2 * | 10/2006 | Kerin ........................... | 285/305 |
| 7,464,970 B2 * | 12/2008 | Yamada et al. ............. | 285/305 |
| 7,494,156 B2 * | 2/2009 | Okada ......................... | 285/93 |
| 7,527,303 B2 * | 5/2009 | Furuya ........................ | 285/305 |
| 7,530,605 B2 * | 5/2009 | Rigollet et al. ............ | 285/305 |
| 7,537,247 B2 * | 5/2009 | Trede et al. ................. | 285/305 |
| 7,566,077 B2 * | 7/2009 | Tsurumi ..................... | 285/93 |
| 7,651,138 B2 * | 1/2010 | Feger et al. ................. | 285/305 |
| 7,695,024 B2 * | 4/2010 | Ostergren et al. .......... | 285/305 |
| 7,731,245 B2 * | 6/2010 | Kerin et al. ................. | 285/93 |
| 2004/0178629 A1 * | 9/2004 | Yoshida ....................... | 285/305 |

FOREIGN PATENT DOCUMENTS

| | | |
|---|---|---|
| EP | 1359361 A1 | 11/2003 |
| JP | 11-230456 A | 8/1999 |
| WO | 96/14535 A1 | 5/1996 |
| WO | 98/28567 | 7/1998 |

OTHER PUBLICATIONS

English Patent Abstract of Publication No. 11-230456 Published Aug. 27, 1999.

* cited by examiner

*Primary Examiner* — David E Bochna
(74) *Attorney, Agent, or Firm* — Ladas & Parry LLP

(57) ABSTRACT

A quick connector can surely prevent incomplete connection of a tube thereto and is provided with a retainer which can be easily returned to its releasing position without being subject to restrictive conditions including working space when the tube connected to the quick connector needs to be removed from the quick connector.

A retainer 16 is provided with arms 31*a* and 31*b* extending so as to be in contact with diametrically opposite parts, respectively, of the outer surface of a housing 12. Locking hooks 34*a* and 34*b* are formed on free end parts of the arms 31*a* and 31*b*, respectively. First stoppers 35*a* and 35*b* are formed on the outer surface of the housing 12 so as to engage with the locking hooks 34*a* and 34*b* of the retainer 16 such that the retainer 16 can be moved from the releasing position only in a direction in which the retainer 16 is pressed into the housing 12.

8 Claims, 5 Drawing Sheets

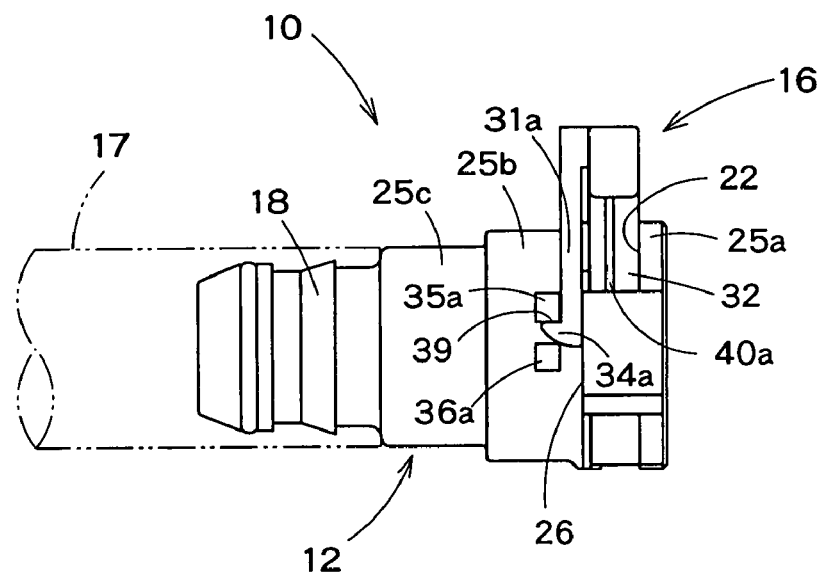
F I G. 2
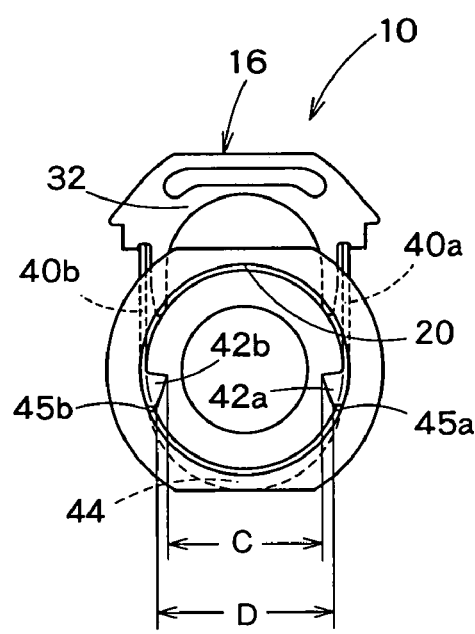
F I G. 3

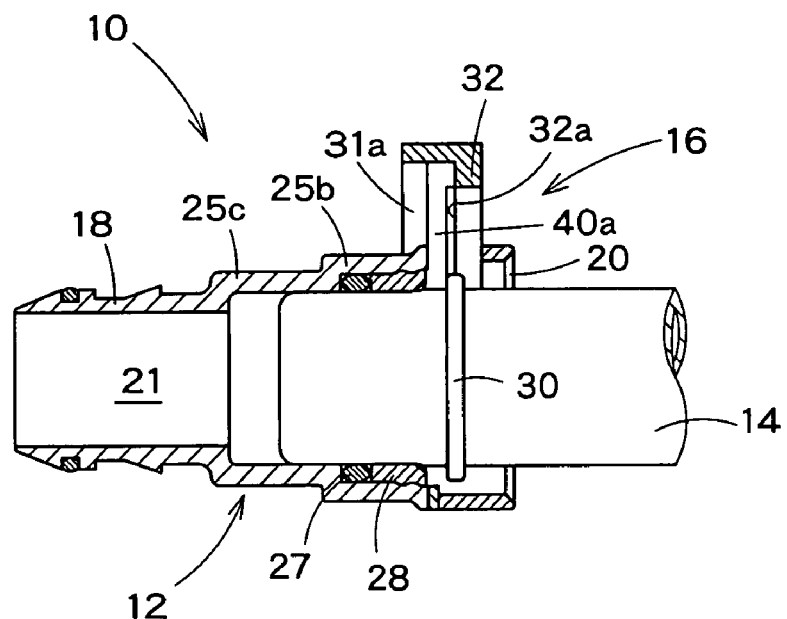
F I G. 4(a)
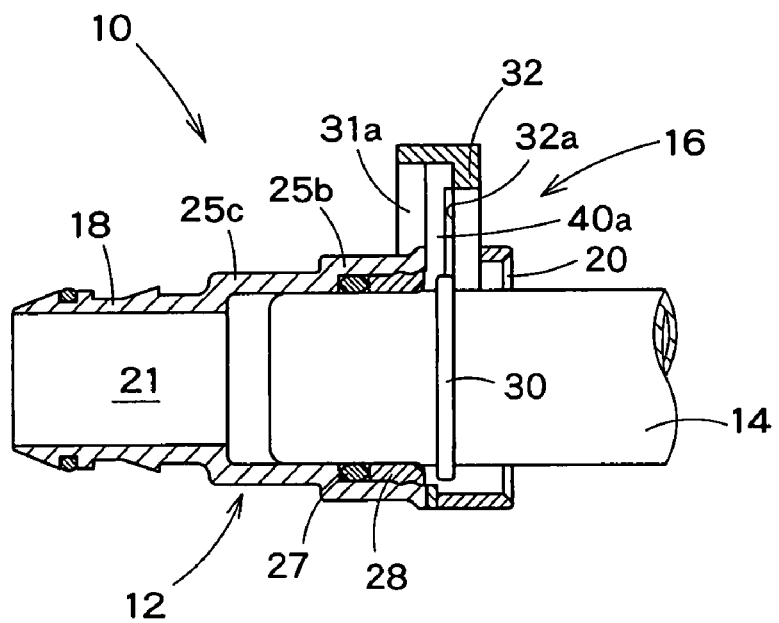
F I G. 4(b)

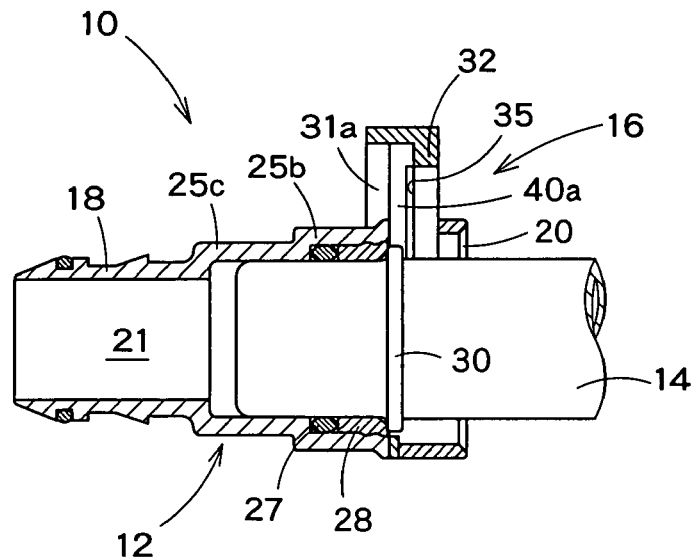
F I G. 5
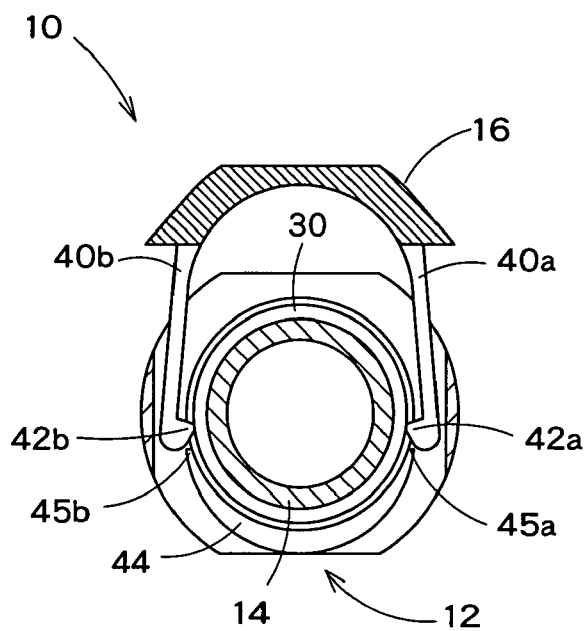
F I G. 6

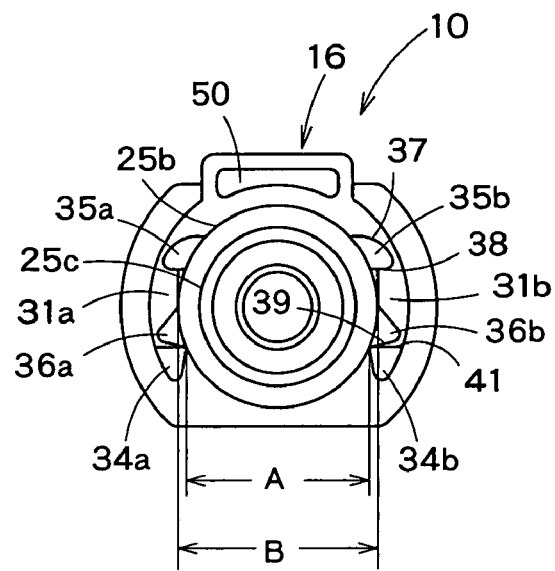
F I G. 7
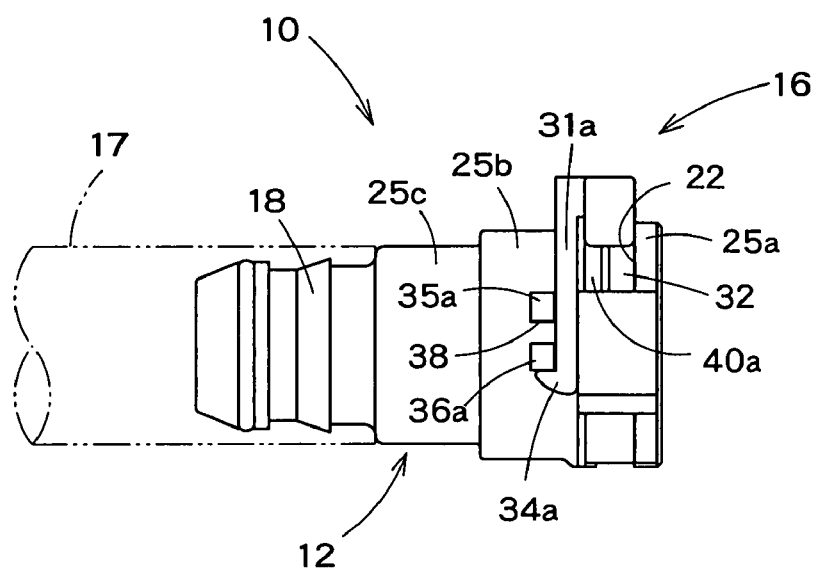
F I G. 8

QUICK CONNECTOR

TECHNICAL FIELD

The present invention relates to a quick connector for connecting tubes serving as automotive fuel lines.

BACKGROUND ART

Quick connectors are used widely for connecting tubes serving as automotive fuel lines. The quick connector is capable of simply and quickly connecting tubes without using any fastening means, such as bolts. The quick connector has a connector housing to be attached to one of two tubes, and a retainer to be pressed in the connector housing after inserting the other tube in the connector housing to retain the tube in the connector housing. Representative quick connectors are disclosed in Patent documents 1 and 2.

In some cases, the retainer is pressed into the connector housing before the other tube is fitted in the connector housing. If the retainer is pushed into the connector housing before pressing the retainer into the connector housing, the tube is connected incompletely to the quick connector. Such incomplete connection of the tube to the quick connector cannot be distinguished from complete connection by appearance.

A quick connector disclosed in Patent document 3 is designed to enable the recognition of such incomplete connection of the quick connector and a tube at a glance. This quick connector includes a complete connection indicating member in addition to a retainer. The complete connection indicating member cannot be easily removed from the quick connector unless the tube is inserted correctly in the quick connector and the retainer is engaged correctly with the tube.

Patent document 1: U.S. Pat. No. 5,542,716
Patent document 2: JP 2002-206683 A
Patent document 3: JP Hei 11-230456 A

DISCLOSURE OF THE INVENTION

Problem to be Solved by the Invention

The known quick connector enables distinguishing incomplete connection from complete connection, but cannot prevent incomplete connection. Inventors of the present invention previously proposed a quick connector capable of surely preventing incomplete connection in Jpn. Pat. App. No. 2003-414947 filed Dec. 12, 2003. The previously proposed quick connector makes pressing a retainer into a connector housing impossible unless a tube is inserted in the connector housing beyond a position where the tube can be completely connected to the connector housing.

Although an object of preventing incomplete connection could be achieved by the retainer of the quick connector proposed in Jpn. Pat. App. No. 2003-414947, a pair of locking hooks locking the retainer in place on the connector housing need to be moved toward each other with fingers to unlock the retainer. The retainer can be unlocked without trouble provided that spaces large enough to receive fingers are available around parts of the connector housing corresponding to the locking hooks. However, when the quick connector is disposed in a narrow space, such as a space over a fuel tank, and there is not any space for receiving fingers around the quick connector, unlocking the retainer requires difficult work. Accordingly, there has been a demand for a retainer capable of being easily unlocked and being returned to its releasing position even if there is no space around the connector, particularly, on a side opposite a retainer inserting direction.

The retainer proposed in Jpn. Pat. App. No. 2003-414947 is held inside a connector housing, which, sometimes, causes the following troubles. The retainer needs to be held at a releasing position on the connector housing before a tube is connected to the quick connector and to be held at a retaining position to which the retainer is pressed into the connector housing to prevent a tube inserted into the connector housing from falling off the connector housing. To return the unlocked retainer from the retaining position to the releasing position, the retainer needs to be provided with arms of a length equal to the distance between the retaining position and the releasing position and projecting outside from the connector housing. If the retainer is not provided with the arms, the retainer entirely pressed into the connector housing cannot be pushed back to the releasing position after the locking hooks have been released by pressing the same toward each other with fingers. Therefore, the arms provided with the locking hooks protrude outside from the connector housing and the protruding arms have the possibility of interfering with other parts disposed near the connector.

Accordingly, it is an object of the present invention to provide a quick connector having a retainer capable of being easily unlocked and returned to its releasing position without being subject to restrictive conditions including working space when a tube connected to the quick connector needs to be disconnected from the quick connector by incorporating improvements into the quick connector proposed in Jpn. Pat. App. No. 2003-414947.

Means for Solving the Problem

To achieve the object, the present invention provides a quick connector including: a housing into which an end part, provided with an annular ridge, of a tube is inserted; and a retainer capable of being inserted through an opening formed in the housing into the housing in a direction perpendicular to the axis of the housing, of engaging with the annular ridge of the tube to retain the tube in place in the housing and of being pressed from a releasing position to a retaining position where the retainer engages with the annular ridge of the tube to connect the tube to the housing; wherein the retainer has a pair of arms capable of coming into contact with diametrically opposite parts, respectively, of the outer surface of the housing, locking hooks are formed at free end parts of the arms, respectively, so as to extend in a direction parallel to the axis of the housing, and the housing is provided on its outer surface with stopping parts that engage with the locking hooks when the retainer is held at the releasing position such that the retainer can move only in a direction in which the retainer is pressed into the housing.

Effect of the Invention

According to the present invention, a complete connection indicating member never can be separated from an interfering part unless the tube is inserted into the housing beyond a position where the tube can be completely connected to the housing. Therefore, the retainer cannot be pressed into the housing. Consequently, the incomplete engagement of the retainer and the tube can be surely avoided. When the tube connected to the quick connector needs to be disconnected from the housing, the retainer can be easily returned from the retaining position to the releasing position without being subject to restrictive conditions including working space.

BRIEF DESCRIPTION OF THE DRAWINGS

FIG. 2 is a side elevation of the quick connector in the preferred embodiment;

FIG. 3 is a front elevation of the quick connector;

FIGS. 4(a) and 4(b) are longitudinal sectional views of the quick connector in the preferred embodiment respectively showing a state where an annular ridge formed on a tube is in contact with a complete connection indicating member and a state where the annular ridge of the tube is at a position on the outer side of a locking point where the annular ridge and the retainer are engaged;

FIG. 5 is a longitudinal sectional view of the quick connector in a state where the tube has been inserted into a housing included in the quick connector deep enough to allow the retainer to be pressed into the housing;

FIG. 6 is a cross sectional view of the quick connector in a state where the annular ridge is at a position shown in FIG. 5 and the complete connection indicating member is expanded;

FIG. 7 is a rear view of the quick connector in a state where the retainer is locked; and FIG. 8 is a side elevation of the quick connector in the state shown in FIG. 7.

BEST MODE FOR CARRYING OUT THE INVENTION

Figure 1:
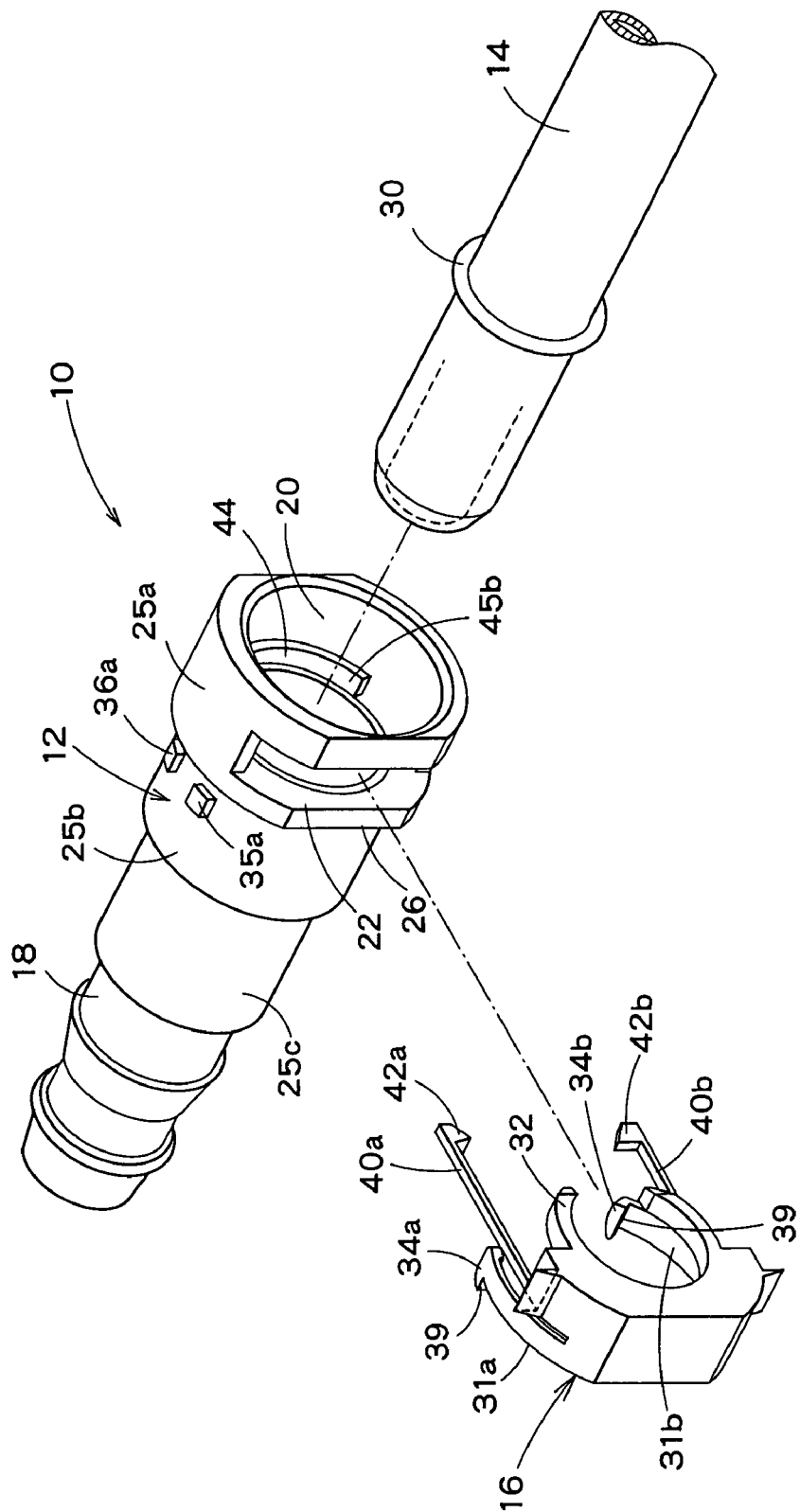
FIG. 1 is an exploded perspective view of a quick connector in a preferred embodiment according to the present invention.

A quick connector in a preferred embodiment according to the present invention will be described with reference to the accompanying drawings.

Referring to FIG. 1 showing a quick connector 10 in a preferred embodiment according to the present invention in an exploded perspective view, the quick connector 10 includes a housing 12 and a retainer 16. FIG. 2 is a side elevation of the quick connector 10 in a state where the retainer 16 is combined temporarily with the housing 12. FIG. 3 is a front elevation of the quick connector 10 in the state shown in FIG. 2. FIG. 4 is a longitudinal sectional view of the quick connector 10 in the state shown in FIG. 2 with a tube 14 inserted into the quick connector 10.

The housing 12 of the quick connector 10 has a female connecting part having an opening 20 through which the tube 14 is inserted in the housing 12, and a male connecting part 18 to be pressed into a resin tube 17. The housing 12 is provided with a stepped, axial through hole 21 as shown in FIG. 4.

A retainer inlet 22 having the shape of a circumferential slot is formed in a large end part 25a of the housing 12. The retainer 16 is inserted through the retainer inlet 22 into the housing 12 in a direction perpendicular to the axis of the housing 12.

The housing has a first cylindrical part 25b extending from the shoulder 26 of the large end part 25a, and a second cylindrical part 25c smaller in diameter than the first cylindrical part 25b and extending from the first cylindrical part 25b. The male connecting part 18 extends from the second cylindrical part 25c. As shown in FIG. 4, an O ring 27 and a top hat 28 for retaining the O ring in place are placed in the first cylindrical part 25b.

Referring to FIGS. 1 and 4, the tube 14 made of a metal or a resin is provided with an annular ridge 30 on its outer surface at a position at a predetermined distance from the free end thereof. The retainer 16 pressed into the housing 12 through the retainer inlet 22 engages with the annular ridge 30 to lock the tube 14 in place such that the tube 14 cannot be removed from the housing 12.

The retainer 16 is made of a plastic material or a metal and has a U-shape. The retainer 16 is thin and a small dimension along the axis of the housing 12.

Referring to FIGS. 1 and 3, the retainer 16 is provided on its inside surface with a curved U-shaped rib 32. The curvature of the curved surface of the U-shaped rib 32 is substantially equal t that of the outside surface of the tube 14. Thus the rib 32 engages closely with the tube 14 inserted into the housing 12.

The retainer 16 is integrally provided with arms 31a and 31b extending in a U-shape so as to be in contact with diametrically opposite parts, respectively, of the outer surface of the first cylindrical part 25b. Locking hooks 34a and 34b are formed on free end parts of the arms 31a and 31b, respectively. The locking hooks 34a and 34b extend in a direction parallel to the axis of the housing 12. The arms 31a and 31b are in contact with the shoulder 26 lying between the large end part 25a and the first cylindrical part 25b. The shoulder 26 guides the arms 31a and 31b when the retainer 16 is moved.

Holding structures respectively for holding the locking hooks 34a and 34b are formed on the outer surface of the first cylindrical part 25b of the housing 12. First stoppers 35a and 35b are formed at positions for retaining the retainer 16 at the releasing position. Second stoppers 36a and 36b are formed at positions for retaining the retainer 16 at the retaining position.

Referring to FIG. 7, when the retainer 16 is pressed into the housing 12 to the retaining position, the retainer 16 is symmetrical with respect to a vertical plane containing the center axis of the housing 12. The first stoppers 35a and 35b, and the second stoppers 36a and 36a are symmetrical with respect to the vertical plane, respectively. Suppose that the retainer 16 is on the upper side of the housing 12. Then the second stoppers 36a and 36b are on the lower side of a horizontal plane containing the center axis of the housing 12. Preferably, the upper ends of the second stoppers 37a and 36b are substantially on the horizontal plane. The first stoppers 35a and 35b are spaced a distance approximately equal to the thickness of the locking hooks 34a and 34b apart upward from the second stoppers 36a and 36b.

Each of the first stoppers 35a and 35b has an upper guide surface curving down and a lower, flat stopping surface 38. The locking hooks 34a and 34b formed on the free end parts of the arms 31a and 31b are hooks extending toward the male connecting part 18. Each of the locking hooks 34a and 34b has an upper, flat catching surface 39. When the retainer 16 is at the releasing position, the catching surfaces 39 of the locking hooks 34a and 34b are parallel to and opposite to the stopping surfaces 38 of the first stoppers 35a and 35b. The stopping surface 38 are perpendicular to a direction in which the retainer 16 is moved to separate the retainer 16 from the housing 12.

When the locking hooks 34a and 34b are engaged with the first stoppers 35a and 35b, the retainer 16 cannot be pulled off the housing 12 and the retainer 16 can move only in a direction in which the retainer 16 is pushed into the housing 12.

The second stoppers 36a and 36b have a substantially triangular cross section. Each of the second stoppers 36a and 36b has beveled upper and lower surfaces. The beveled lower surfaces of the second stoppers 36a and 36b are stopping surfaces 41 that engage with the locking hooks 34a and 34b, respectively. The second stoppers 36a and 36b differ from the first stoppers 35a and 35b in that the stopping surfaces 41 are properly inclined to the horizontal plane such that the retainer 16 can be moved from the retaining position to the releasing position only when the retainer 16 is pulled by a force exceeding a proper threshold force.

The retainer 16 can be returned to the releasing position by the resilience of the arms 31a and 31b after the locking hooks 34a and 34b have been disengaged from the second stoppers 36a and 36b. As shown in FIG. 7, the outside diameter B of the first cylindrical part 25b provided on its outer surface with the second stoppers 36a and 36b is greater than the distance A between the locking hooks 34a and 34b of the retainer 16 in a free state. When the retainer 16 is pulled in a removing direction and the locking hooks 34a and 34b climb over the second stoppers 36a and 36b, the arms 31a and 31b are warped. The resilience of the warped arms 31a and 31b is used for moving the retainer 16 in the removing direction.

The retainer 16 is provided integrally with complete connection indicating members 40a and 40b for indicating the positional relation between the retainer 16 and the tube 14 in which the tube 14 can be completely connected to the housing 12.

The complete connection indicating members 40a and 40b have the shape of a thin, elongate bar. The complete connection indicating members 40a and 40b extend near the rib 32 and have probing hooks 42a and 42b on free end parts thereof, respectively. The probing hooks 42a and 42b project from the complete connection indicating members 40a and 40b toward each other.

The housing 12 is provided with a land 44 that interferes with the probing hooks 42a and 42b of the complete connection indicating members 40a and 40b. Referring to FIGS. 1 and 3, the land 44 is formed in a crescent-shape along the edge of the open end of the bore of the first cylindrical part 25b. The land 44 has opposite ends 45a and 45b with which the probing hooks 42a and 42b of the complete connection indicating members 40a and 40b engage, respectively.

The distance C between the probing hooks 42a and 42b of the complete connection indicating members 40a and 40b in a free state is shorter than the diameter D of the annular edge 30 of the tube 14. When the tube 14 is inserted correctly into the housing 12, the annular ridge 30 comes into contact with the probing hooks 42a and 42b without fail. The distance between the ends 45a and 45b of the land 44 is determined such that the ends 45a and 45b of the land 44 are directly below the probing hooks 42a and 42b of the complete connection indicating members 40a and 40b in a free state. In this state, the retainer 16 cannot be pressed into the housing unless a pressure not lower than a predetermined threshold pressure is applied to the retainer 16.

The operation of the quick connector thus constructed will be described.

Temporary assembly of the retainer 16 and the housing 12 will be explained.

Referring to FIG. 1, the retainer 16 is pressed lightly through the retainer inlet 22 formed in the housing 12 into the housing 12. Then, the locking hooks 34a and 34b formed on the free end parts of the arms 31a and 31b are held between the first stopper 35a and a second stopper 36a and between the first stopper 35b and the second stopper 36b, respectively, as shown in FIG. 2. Thus the retainer 16 is retained at the releasing position.

A product formed by connecting a resin tube 17 to the male connecting part 18 of the quick connector 10 temporarily assembled by setting the retainer 16 at the releasing position on the housing 12 is shipped to the user. Suppose that the user uses the quick connector 10 for connecting fuel lines for supplying fuel to an engine in an automobile assembly shop. The user only needs to press the retainer 16 into the housing 12 after inserting a metal tube 14 into the housing 12.

When the end part of the tube 14 is inserted through the opening 20 into the housing 12 as shown in FIG. 4(a), the annular ridge 30 of the tube 14 comes into contact with the probing hooks 42a and 42b of the complete connection indicating members 40a and 40b. The depth of insertion of the tube 14 into the housing 12 is not deep enough and the retainer 16 cannot be pressed into the housing 12 because the probing hooks 42a and 42b of the complete connection indicating members 40a and 40b touch the ends 45a and 45b of the land 44 when the annular ridge 30 is at a position shown in FIG. 4(a).

When the tube 14 is inserted into the housing 12 to a position shown in FIG. 4(b), an end of the annular ridge 30 of the tube 14 coincides substantially with the end surface 32a, namely, a retaining surface, of the rib 32 of the retainer 16. In this state, the annular ridge 30 is substantially at a locking point where the retainer 16 can engage with the annular ridge 30.

However, when the tube 14 is at the position shown in FIG. 4(b), the distance between the probing hooks 42a and 42b of the complete connection indicating members 40a and 40b is not increased sufficiently by the annular ridge 30 and hence the probing hooks 42a and 42b of the complete connection indicating members 40a and 40b are in contact with the ends 45a and 45b of the land 44. Thus the insertion of the retainer 16 into the housing 12 is obstructed and the retainer 16 cannot be pressed into the housing 12 even if a considerable pressure is applied to the retainer 16 and, consequently, the operator can intuitionally know that the tube 14 has not been inserted to the connecting position in the housing 12.

The tube 14 is pushed further deep into the housing 12. Then, the annular ridge 30 increases the distance between the probing hooks 42a and 42b of the complete connection indicating members 40a and 40b and the hand pushing the tube 14 feel a resistance. When the tube 14 is pushed into the housing 12 as far as the annular ridge 30 is pressed against the top hat 28 as shown in FIG. 5, the complete connection indicating members 40a and 40b and the annular ridge 30 are aligned. In the state shown in FIG. 5, the probing hooks 42a and 42b of the complete connection indicating members 40a and 40b are separated from the ends 45a and 45b of the land 44. Consequently, the retainer 16 can be pressed into the housing 12.

As the retainer 16 is pressed further into the housing 12, the arms 31a and 31b are warped away from each other, and the locking hooks 34a and 34b climb over the second stoppers 37a and 36b and engage with the stopping surfaces 41, respectively.

If the tube 14 is pulled outward, the annular ridge 30 is restrained from moving outward by the rib 32 of the retainer 16. thus the axial movement of the tube 14 relative to the housing 12 is prevented. Thus the retainer 16 locks the tube 14 in place and firmly connects the tube 14 and the quick connector 10. The gap between the housing 12 and the tube 14 is sealed by the O ring 27. The retainer 16 has strength sufficient for preventing the disengagement of the locking hooks 34a and 34b from the second stoppers 36a and 36b under normal working conditions.

Thus the tube 14 can be easily completely connected to the housing 12 and the tube 14 can be pulled off the housing 12 after unlocking the retainer 16 as follows.

Referring to FIG. 7, the retainer 16 is provided with a recess 50. A tool, such as a screw driver, is applied to the recess 50 and an upward force is applied to the retainer 16 by the tool. Since the stopping surfaces 41 of the second stoppers 36a and 36b in engagement with the locking hooks 34a and 34b are beveled, the locking hooks 34a and 34b can be separated from the stopping surfaces 41 without being damaged by applying a proper force to the retainer 16 with the screw driver.

Whereas the retainer 16 can be thus easily removed from the housing 12 when the housing 12 is disposed, for example, immediately above a fuel tank, a known retainer having locking hooks that engage with the inside surface of a housing to lock a tube in place and can be unlocked by being compressed by fingers cannot be easily removed from the housing unless a sufficient working space for disengaging the locking hooks from the housing is available. Thus the quick connector 10 of the present invention is superior to the known quick connector.

The warped arms 31a and 31b tend to restore to their original state by their own resilience after the locking hooks 34a and 34b have climbed over the second stoppers 36a and 36b. Consequently, the retainer 16 is returned automatically to the releasing position by the resilience of the arms 31a and 31b.

The stoppers 35a, 35b, 36a and 36b with which the locking hooks 34a and 34b of the retainer 16 engage are formed on the outer surface of the housing. Therefore, any space necessary for receiving the locking hooks which engage with the inside surface of the housing does not need to be prepared in the housing for the locking hooks 34a and 34b and, accordingly, the housing can be formed in a small diameter and in a small size. Since the locking hooks 34a and 34b can be extended in a direction parallel to the axis of the housing, the locking hooks 34a and 34b, as compared with radially extending locking hooks of the known quick connector, have less possibility of interfering with adjacent equipment and being damaged. Thus the quick connector of the present invention has an advantage over the known quick connector.

The invention claimed is:

1. A quick connector comprising:
a housing into which an end part, provided with an annular ridge, of a tube can be inserted; and
a retainer capable of being inserted through an opening formed in the housing into the housing in a direction perpendicular to an axis of the housing to engage the annular ridge of the tube and to retain the tube in place in the housing, the retainer being movable from a releasing position to a retaining position where the retainer engages the annular ridge of the tube to connect the tube to the housing;
wherein the retainer has a pair of arms extending in a U-shape so as to be in contact with diametrically opposite parts on the outer surface of the housing, locking hooks being formed on free ends of the arms, the housing being provided on its outer surface with stopping parts that engage the locking hooks when the retainer is held at the releasing position such that the retainer can move only in a direction in which the retainer is pressed into the housing, a distance between the pair of locking hooks being shorter than the outside diameter of the housing, and
wherein the retainer is provided integrally with complete connection indicating members capable of being moved away from each other by the annular ridge so as to allow the retainer to be pressed into the housing when the annular ridge is moved into the housing beyond a position where the retainer and the annular ridge can be engaged, the housing being provided with a land that interferes with the complete connection indicating members in a state where the tube is incompletely inserted into the housing to prevent the retainer from being pressed into the housing.

2. The quick connector according to claim 1, wherein the stopping parts include first stopping parts that engage the locking hooks when the retainer is held at the releasing position second stopping parts with which the locking hooks engage when the retainer is at the retaining position.

3. The quick connector according to claim 2, wherein the locking hooks formed on the free ends of the arms are hook-shaped tongues respectively having flat catching surfaces, and the first stopping parts have engaging surfaces with which the catching surfaces of the locking hooks engage, when the retainer is at the releasing position.

4. The quick connector according to claim 2, wherein the second stopping parts have beveled engaging surfaces that permit the disengagement of the locking hooks therefrom, when a predetermined force is exerted on the retainer so as to return the retainer to the releasing position.

5. The quick connector according to claim 4 further comprising an automatic returning mechanism that exerts a returning force capable of returning the retainer to the releasing position on the retainer when the locking hooks are disengaged from the second stopping parts.

6. The quick connector according to claim 5, wherein the outside diameter of a section of the housing which is provided with the second stopping parts, is greater than the distance between the locking hooks of the retainer, and the automatic returning mechanism uses a resiliency of the arms when the locking hooks climb over the second stopping parts for returning the retainer to the releasing position.

7. The quick connector according to claim 1, wherein the locking hooks of the pair of arms extend in a direction parallel to the axis of the housing.

8. The quick connector according to claim 1, wherein the pair of arms are capable of extending on opposite sides of a horizontal plane containing a central axis of the housing.

* * * * *